(12) United States Patent
Neumann et al.

(10) Patent No.: US 10,220,796 B2
(45) Date of Patent: Mar. 5, 2019

(54) DEVICE HOLDERS

(71) Applicant: Ford Global Technologies LLC, Dearborn, MI (US)

(72) Inventors: Michael Neumann, Gisborne (AU); Andrew David Clarke, Tallarook (AU); Aurelien Pierre Christian Delaruelle, Glenroy (AU); Nick David Eterovic, Brunswick West (AU); Maurizio Tocco, Middle Park (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/880,327

(22) Filed: Jan. 25, 2018

(65) Prior Publication Data

US 2018/0222400 A1 Aug. 9, 2018

(30) Foreign Application Priority Data

Feb. 9, 2017 (CN) .......................... 2017 1 0138698

(51) Int. Cl.
*B60R 11/02* (2006.01)
*B60R 7/04* (2006.01)
*B60R 11/00* (2006.01)
*B64D 11/00* (2006.01)

(52) U.S. Cl.
CPC ............ *B60R 11/02* (2013.01); *B60R 7/043* (2013.01); *B60R 11/0241* (2013.01); *B60R 11/0252* (2013.01); *B60R 2011/0015* (2013.01); *B60R 2011/0071* (2013.01); *B60R 2011/0075* (2013.01); *B60R 2011/0084* (2013.01); *B60R 2011/0092* (2013.01); *B64D 11/00152* (2014.12)

(58) Field of Classification Search
CPC . B60R 11/02; B60R 11/0241; B60R 11/0252; B60R 2011/0071; B60R 2011/0015; B60R 2011/0082; B60R 2011/0084; B60R 7/04; B60R 7/043; B64D 11/00152; F16M 11/041
USPC ............................... 224/275, 929; 248/316.4
See application file for complete search history.

(56) References Cited

U.S. PATENT DOCUMENTS

| | | | | |
|---|---|---|---|---|
| 5,788,202 A * | 8/1998 | Richter | ............... | B60R 11/0241 224/570 |
| 5,961,016 A * | 10/1999 | Hartmann | ........... | B60R 11/0241 224/539 |
| 7,407,143 B1 * | 8/2008 | Chen | .................... | B60R 11/0241 248/309.1 |
| 7,967,269 B2 * | 6/2011 | Liu | ........................ | G03B 21/58 248/176.3 |

(Continued)

FOREIGN PATENT DOCUMENTS

DE 202004006834 U1 7/2004
DE 202011051891 U1 11/2011

(Continued)

*Primary Examiner* — Justin Larson
(74) *Attorney, Agent, or Firm* — Vichit Chea; Mohr IP Law Solutions, PC (57) ABSTRACT

A device holder to hold an electronic device is provided. The device holder comprises an upper arc arm; a lower arc arm; and a drive device. The upper arm and the lower arc arms are attached to the drive device and moveably between a non-use position and a use position and the drive device enables a synchronized movement of the upper arc arm and a lower arc arm at opposite directions.

20 Claims, 10 Drawing Sheets

(56) References Cited

U.S. PATENT DOCUMENTS

| | | | | |
|---|---|---|---|---|
| 8,123,051 B2* | 2/2012 | Johnson | ............... | A47F 7/0021 |
| | | | | 211/87.01 |
| 8,567,737 B2* | 10/2013 | Chen | ................ | F16M 11/041 |
| | | | | 248/313 |
| 8,727,192 B2* | 5/2014 | Lai | .................. | B60R 11/0241 |
| | | | | 224/282 |
| 9,161,466 B2* | 10/2015 | Huang | ............... | H05K 5/0204 |
| 9,452,717 B2* | 9/2016 | Dry | ..................... | B60R 11/02 |
| 9,457,725 B2* | 10/2016 | McClain | ............. | B60N 3/004 |
| 9,473,607 B2* | 10/2016 | An | ......................... | H04M 1/11 |
| 9,511,862 B2* | 12/2016 | Thiele | ............. | B64D 11/00152 |
| 9,797,543 B2* | 10/2017 | Lin | .................... | E05B 73/0082 |
| 9,919,659 B2* | 3/2018 | Kipp | ................... | B60N 2/2222 |
| 10,001,153 B1* | 6/2018 | Fan | ......................... | F16B 2/12 |
| 2007/0262223 A1* | 11/2007 | Wang | ............... | B60R 11/0241 |
| | | | | 248/346.07 |
| 2011/0278885 A1* | 11/2011 | Procter | ............. | B60R 11/0235 |
| | | | | 297/135 |
| 2012/0312847 A1* | 12/2012 | LaColla | ................ | B60R 11/02 |
| | | | | 224/275 |
| 2013/0206942 A1* | 8/2013 | Trotsky | .............. | F16M 11/041 |
| | | | | 248/274.1 |
| 2013/0240587 A1* | 9/2013 | Buchhalter | ........ | B60R 11/0241 |
| | | | | 224/570 |
| 2013/0270850 A1* | 10/2013 | Fan | ......................... | A45F 5/00 |
| | | | | 294/137 |
| 2014/0060218 A1* | 3/2014 | Bisesti | ................ | F16M 11/04 |
| | | | | 73/865.8 |
| 2014/0346202 A1* | 11/2014 | McClain | ............. | B60N 3/004 |
| | | | | 224/275 |
| 2015/0060624 A1* | 3/2015 | Huang | ............... | H05K 5/0204 |
| | | | | 248/316.4 |
| 2015/0189055 A1* | 7/2015 | An | ......................... | H04M 1/11 |
| | | | | 455/573 |
| 2015/0196140 A1* | 7/2015 | Lin | ....................... | F16M 13/02 |
| | | | | 248/551 |
| 2016/0167587 A1 | 6/2016 | Dry et al. | | |
| 2016/0355263 A1* | 12/2016 | Pozzi | .............. | B64D 11/00152 |
| 2017/0327054 A1* | 11/2017 | Yu | ............................ | G06F 1/16 |
| 2018/0222400 A1* | 8/2018 | Neumann | ............. | B60R 11/02 |

FOREIGN PATENT DOCUMENTS

| | | |
|---|---|---|
| KR | 101546941 B1 | 8/2015 |
| WO | 2016020480 A1 | 2/2016 |

\* cited by examiner

DEVICE HOLDERS

RELATED APPLICATION

This application claims the benefit of Chinese Patent Application No.: CN 201710138698.7 filed on Mar. 9, 2017, the entire contents thereof being incorporated herein by reference.

FIELD

The present disclosure relates generally to device holders, in particular, device holders for holding electronic devices on a back of a seat or other desired places.

BACKGROUND

An occupant of a vehicle may want a device holder to hold an electric device such as a smart phone and a tablet so that he or she can use the electronic device or view the content displayed without holding the electronic device by hands. One area to place the device holder is a back of a seat. It can be a challenge to design the device holders fitted into a seat back because the seats can have various configurations and the space between the seat back and a seat behind is limited. Further, the existence of varied sizes of the electronic devices demands a universal device holder for various sizes of the electronic devices. The inventors have recognized that it is desirable to have a device holder that can fit the different configurations of the seats and hold the electronic devices with different sizes.

SUMMARY

According to one aspect, a device holder is provided. The device holder comprises an upper arc arm; a lower arc arm; and a drive device. The upper arm and the lower arc arms are attached to the drive device and moveably between a non-use position and a use position and the drive device enables a synchronized movement of the upper arc arm and a lower arc arm at opposite directions.

In one embodiment, the drive device may include a main gear, an upper secondary gear, and a lower secondary gear. The upper arc arm may include an upper gear rack and the lower arc arm includes a lower gear rack. The upper secondary gear is engaged with the upper gear rack and the main gear, respectively, and the lower secondary gear is engaged with the lower gear rack and the main gear, respectively.

In another embodiment, the device holder may further include a swing body. The swing body may have a first side and a second side. The main gear may be disposed on the second side of the swing body, and the upper secondary gear and the lower secondary gear are disposed on the first side of the swing body. A thickness of the upper and lower secondary gears is greater than a thickness of the main gear.

In another embodiment, centers of the upper secondary gear, the main gear and the lower secondary gear may be positioned substantially in a line that is substantially parallel to a moving path of the upper and lower arc arms.

In another embodiment, the swing may include a middle recess opened to the second side and configured to receive the main gear, an upper recess opened to the first side and configured to receive the upper secondary gear, and a lower recess opened to the first side and configured to receive the lower secondary gear. A wall defined the middle recess may include two apertures connecting the upper and lower recesses so that the main gear is engaged with the upper and lower secondary gears.

In another embodiment, the device holder may further comprise a damper linked with the upper secondary gear.

In another embodiment, further comprising a tape spring attached to the lower arc arm or the upper arc arm, or a plurality of springs attached to both the upper and the lower arms to bias the upper and lower arc arms in the closed position.

In another embodiment, the device holder may further comprise a fixed body, two guides disposed on the fixed body, and the swing body is attached to the fixed body and disposed between the two guides.

In another embodiment, further comprising a push-push mechanism being locked and unlocked with the swing body.

In another embodiment, the push-push mechanism includes a selector having a rotation arm to receive a pin connected to the swing body to lock and unlock the swing body, and a selector guide, wherein the selector is disposed in the selector guide.

In another embodiment the device holder may further include a base, and the upper secondary gear, the main gear and the lower secondary gear are attached to the base and disposed on one side the base.

In another embodiment, centers of the upper secondary gear and the lower secondary gear may be closer to a respective side of the base than a center of the main gear and the base is moveable.

In another embodiment, the device holder may further comprise a clock spring disposed inside the main gear, and the clock spring is configured to maintain the upper and lower arc arms in the closed position.

In another embodiment, the device holder may further comprise a push-push mechanism, and the push-push mechanism includes a lock pin disposed on one side of body and coupled with the upper arc arm, and the lock pin is released to unlock the upper and lower arc arms when an upper edge of the upper arc arm is pressed by a user.

According to another aspect, a device holder may comprise a base; an upper arc arm; a lower arc arm; and a drive device attached to the base. The upper arc arm and the lower arc arm are attached to the drive device and moveably along a circumference of a circle having a center away from the base of the drive device.

In one embodiment, the drive device includes a main gear, an upper secondary gear and a lower secondary gear. The upper arc arm may include an upper gear rack and the lower arc arm includes a lower gear rack, and the upper secondary gear is engaged with the upper gear rack and the main gear, respectively, and the lower secondary gear is engaged with the lower gear rack and the main gear, respectively.

According to yet another aspect, a seat comprises a seat back, a device holder attached to the seat back. The device holder may include a base; an upper arc arm; a lower arc arm, and a drive device attached to the base. The upper arm and the lower arc arm are connected to the drive device and moveably along a common arc in opposite directions between a closed position and an open position.

In one embodiment, the upper arc arm may include an upper edge portion and the lower arc arm includes a lower edge portion, and the upper and lower edge portions are configured to be extended away from the seat back at the open position to hold an electronic device.

In another embodiment, the seat further comprises a seat cover, and the electric device holder is disposed substantially inside the seat cover. The upper and lower edge portions are visible at the closed position, and the device holder includes a push-push mechanism and the upper arc arm and the lower arc arm are unlocked via actuation of the push-push mechanism or a swing body to which the upper arc arm and the lower arc arm are attached is unlocked via actuation of the push-push mechanism.

In another embodiment, the electric device holder may be fixed on a frame of the seat.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed device holders will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of device holders are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

FIGS. 1A-1D show a seat 2 in which embodiments of a device holder 10 may be implemented. The seat 2 may include a seat back 4 and a seat cover 6. The device holder 10 may be attached to the seat back 4. In some embodiments, the seat 2 may be a seat in a vehicle and the device holder 10 may be attached to a frame of the seat 2 as an integral part of the seat 2. The device holder 10 may further be used on an instrumental panel, a center console or other places in the vehicle via any suitable attaching mechanisms such as via a clipping feature. In some embodiments, the device holder 10 may be an after-market product configured to fit various types of seats, such as a seat in a vehicle, a train, an airplane, or a theater, for example. The device holder 10 may be a device holder to retain the electronic devices such as a smart phone, a tablet. As shown in FIGS. 1A-1D, the device holder 10 includes an upper arc arm 12 having an upper edge 14 and a lower arc arm 16 having a lower edge 18. At a non-use position shown in FIG. 1A, the device holder 10 is substantially concealed by the seat cover 6 and only edges such as the upper edge 14 and lower edge 18 are visible. In some embodiments, the device holder 10 may include a push-push mechanism to unlock the device holder 10. The upper edge 14 or the lower edge 18 may be used to activate the push-push mechanism as described in detail below. In these embodiments, only the upper edge 14 and the lower edge 18 are visible.

Figure 1A:
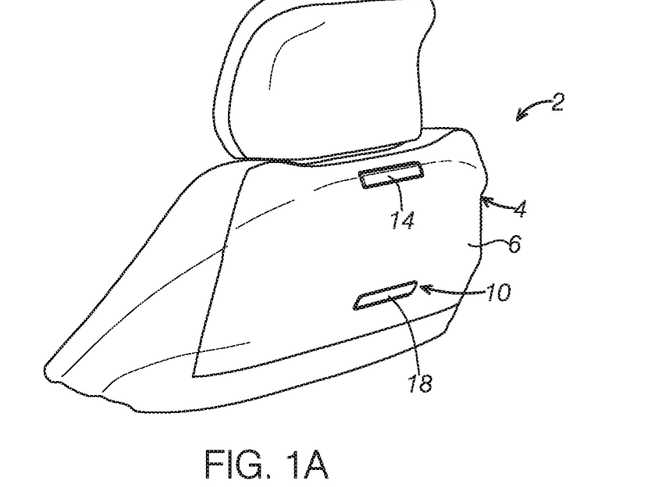
FIGS. 1A-1D show a seat in which illustrative embodiments may be implemented, illustrating a device holder at a use position and a non-use position.
Figure 1B:
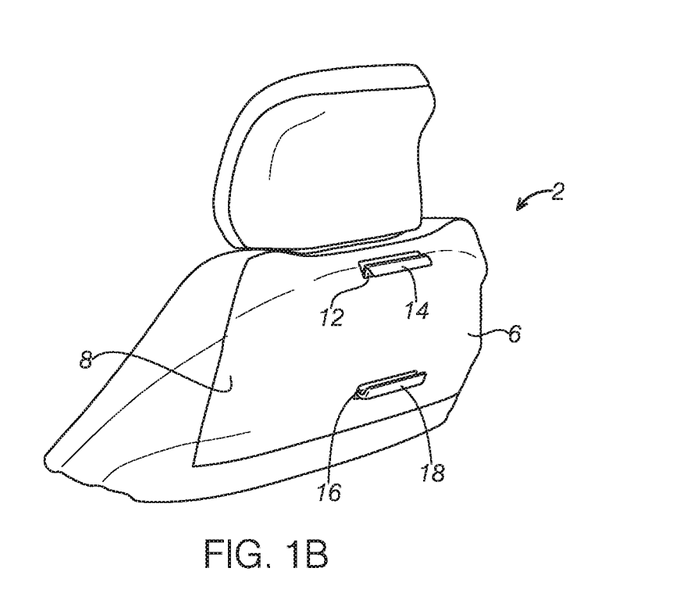

FIG. 1B shows the device holder 10 at an activated position where the push-push mechanism of the device holder 10 is activated or unlocked after a user pushes the upper edge 14 or the lower edge 18. At the activated position, the upper edge 14 and the lower edge 18 are popped out further from a surface 8 of the seat back 4. At this position. The user can pull either the upper edge 14 or the lower edge 18 further to a use position to hold the electronic device. The device holder 10 is configured to enable a synchronized movement of the upper arc arm 12 and the lower arc arm 16. As such, a movement of one arc arm results in a corresponding movement of another arc arm in an opposite direction.

Figure 1C:
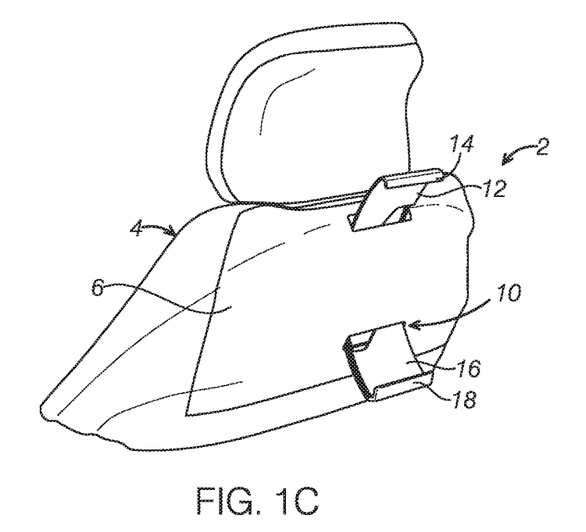

FIG. 1C shows the device holder 10 at a use position. The upper arc arm 12 and the lower arc arm 16 are extended further away from the seat back 4. The user can adjust a distance between the upper edge 14 and the lower edge 18 by pulling up the upper edge 14 or pushing down the lower edge 18. In this way, the device holder 10 is universal in accommodating different sizes of the electronic devices.

While the seat cover 6 is used in the illustrated embodiments, it should be appreciated that the device holder 10 may be disposed on a seat without a seat cover.

Figure 1D:
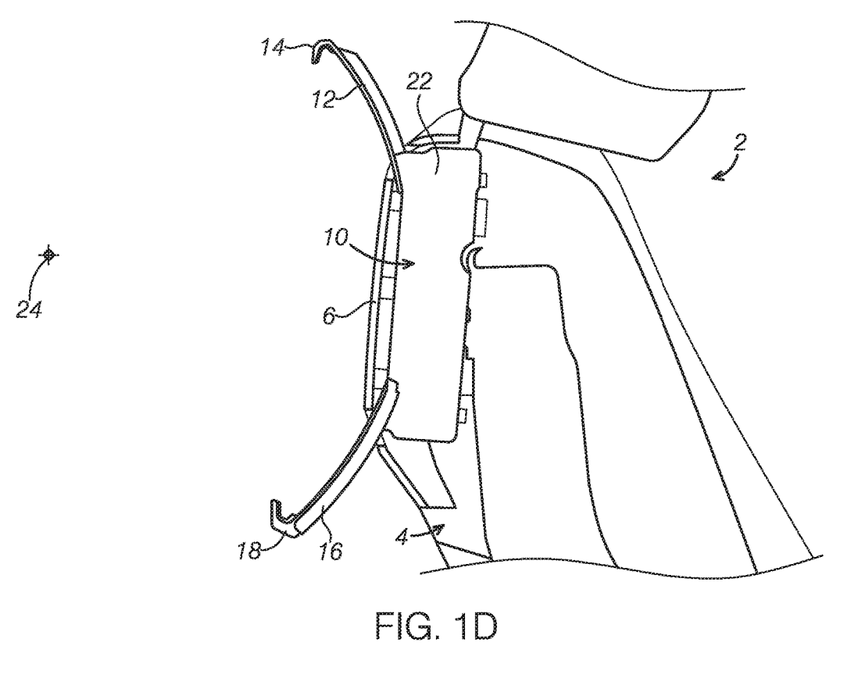

FIG. 1D is a side view of the device holder 10 at the use position, illustrating the device holder 10 attached to the seat back 4. A base 22 of the device holder 10 may be attached to the seat back 4 with any appropriate approaches such as bolts/nuts connection and welding, for example. The upper arm 12 and the lower arm 16 are configured to move in opposite directions along an arc path. In some embodiments, the upper arm 12 and the lower arm 16 are configured to move along a common arc at opposite directions or move along a circumference of a circle at the opposite directions. A center 24 of the circle is located away from the base 22 of the device holder 10 and the seat 2. As the arc arms are curved and extended from a plane of the seat back 4, the device holder 10 can adapt to various shapes of the seats by varying the configuration and/or dimension of the upper and lower arc arms 12, 16 or varying an arc path of the movement of the upper and lower arc arms 14, 18. As described below, the base 22 may be moveable, which further provides capability to adapt to the shape of the seat back 4 by translation or swing motion of the base 22.

A device holder may include a drive device to enable coordinated or synchronized movement of the upper and lower arc arms of the device holder at opposite directions. For example, the drive device may enable the upper and lower arc arms to move apart at an equal distance or an equal rate. According to one aspect of the present disclosure, the upper arc arm and the lower arc arm are attached to the drive device and moveably between a closed position or a non-use and an open position or a use position. In some embodiments, the drive device may include a main gear, an upper secondary gear, and a lower secondary gear and the upper arc arm may include an upper gear rack engaged with the upper secondary gear and the lower arc arm may include a lower gear rack engaged with the lower side. In this way, the upper arc arm and the lower arc arm may be moved in opposite directions by activation of the drive device.

Figure 2:
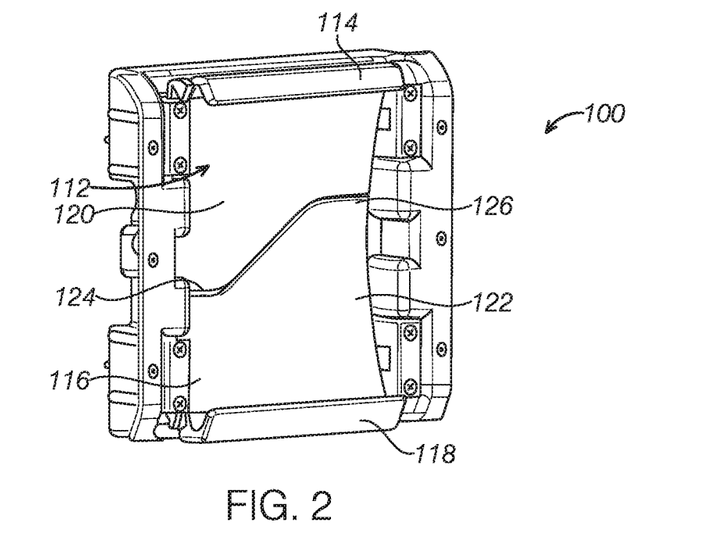
FIG. 2 show a rotated view of a device holder at a non-use position according to one embodiment of the present disclosure.

FIG. 2 shows a rotated view of a device holder 100 at a non-use position or a closed position according to one embodiment of the present disclosure. The device holder 100 may include an upper arm 112 having an upper edge 114 and a lower arc arm 116 having a lower edge 118. The upper arm 112 may further include an upper cover 120 and the lower arm 116 may further include a lower cover 122. The upper cover 120 may be a wave-shaped plate having a curved lower border 124. Similarly, the lower cover 122 may be a wave-shaped plate having a curved upper border 126 complement to the curved lower border 124 of the upper cover 120. As shown in FIG. 2, the curved lower border 124 of the upper arm body 120 is aligned with the curved upper border 126 of the lower arm body 122 to substantially conceal the inside parts of the device holder 100 at the closed position.

As shown in FIG. 2, the upper edge 114 of the upper arc arm 112 may further include a C-shaped grip portion and the lower arm 112 may include a C-shaped grip portion to receive edges of the electronic device.

It should be appreciated that the upper arm 112 and the lower arm 116 may have any appropriate shape to hold a device such as an electronic device at a use position and function as a cover to the device holder at a non-use position.

Figure 3:
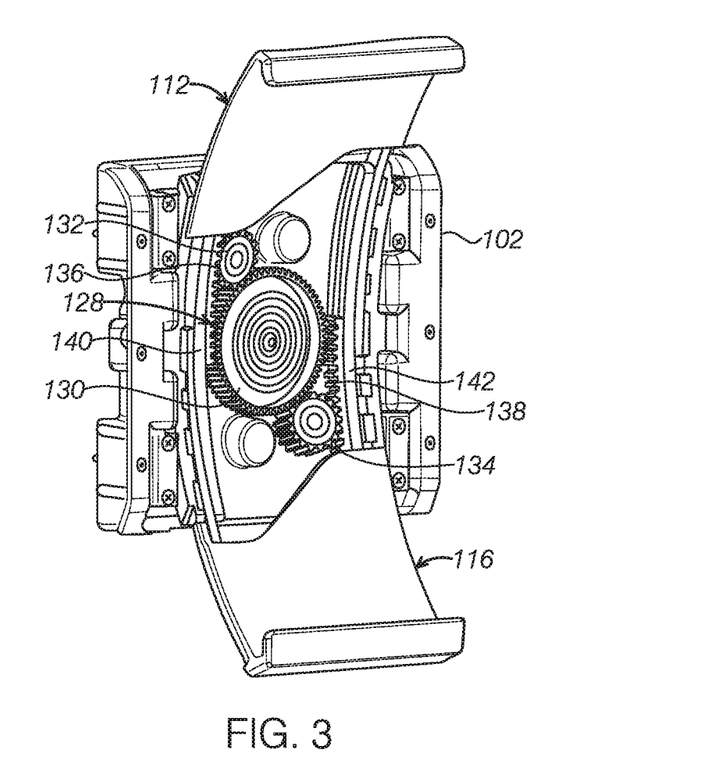
FIG. 3 shows a rotated view of the device holder depicted in FIG. 2 at a use position.

FIG. 3 shows a rotated view of the device holder 100 in FIG. 2 at a use position or an open position. The device holder 100 may include a base 102 and a drive device 128 that enables synchronized movement of the upper arc arm 112 and the lower arc arm 116. The drive device 128 may include a main gear 130, an upper secondary gear 132 engaged with the main gear 130 and a lower secondary gear 134 engaged with the main gear 130. The device holder 100 may include an upper gear rack 136 attached to the upper arc arm 112 and engaged with the upper secondary gear 132. The device holder 100 may further include a lower gear rack 138 attached to the lower arc arm 116 and engaged with the lower secondary gear 134. Rotation of the main gear 130 enables simultaneous rotations of the upper secondary gear 132 and the lower secondary gear 134 while the rotations are converted to linear motion of the upper and lower arc arms 112, 116 via the engagement between the upper secondary gear 132 and the upper gear rack 136 and the engagement between the lower secondary gear 134 and the lower gear rack 138. In other words, linear motion of the upper arc arm 112 can be converted to rotations of the upper secondary gear 132, the main gear 130 and the lower secondary gear 134, which in turn is converted to a linear motion of the lower arc arm 116, and vice versa. As such, coordinated movement of the two arc arms can be accomplished.

The main gear 130, the upper secondary gear 132 and the lower secondary gear 134 may be disposed on one side of the base 102. In some embodiments, the main gear 130, the upper secondary gear 132 and the lower secondary gear 134 may be disposed diagonally on the one side of the base 102. In some embodiments, the main gear 130, the upper secondary gear 132 and the lower secondary gear 134 may be tapered gears. For example, main gear 130, the upper secondary gear 132 and the lower secondary gear 134 may have conic configuration to facilitate the movement of the upper and lower arms 112 and 116. An upper movement of the upper arc arm 112 will result in down movement of the lower arc arm 116 via the drive device 128 and vice versa. In this way, synchronized movement of the upper and lower arc arms 112 and 116 can be achieved.

In some embodiments, the device holder 100 may further include a first guide rail 140 and a second guide rail 142 disposed on the base 102. The upper arc arm 112 and the lower arc arm 116 are configured to move along the first guide rail 140 and the second guide rail 142, respectively. The first and second guide rails 140, 142 may be curved to conform the shape of the upper and lower arc arms 112, 116.

Figure 4:
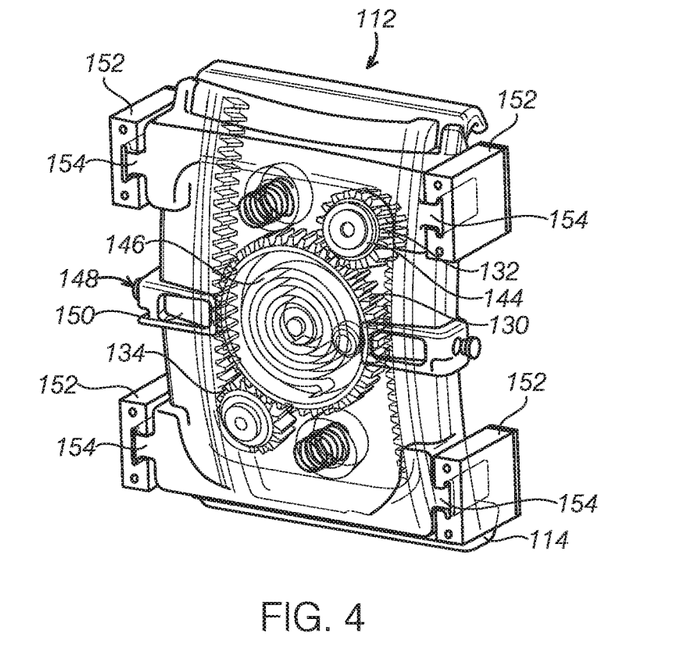
FIG. 4 is a rotated view of the device holder depicted in FIG. 2. with the top a base removed so as to illustrate the mechanisms to operate the device holder.

The device holder 100 may include additional parts as illustrated in the exploded view in FIG. 4. In some embodiments, a damper 144 may be linked to the upper secondary gear 132 to regulate the movement of the gears. The damper 144 may be a viscous damper disposed inside the upper and lower secondary gears 132, 134, respectively. In other embodiment, the damper 144 may a standard viscous damper disposed adjacent to one of the upper and lower secondary gears 132, 134. With the controlled motion, when an electronic device is removed from the device holder 100, the upper arc arm 112 and lower arc arm 116 can be returned to the closed position through damped movement.

Continuing with FIG. 4, in some embodiments, the device holder 100 may include a spring to bias the upper and lower arc arms 112, 116 at a closed position. In the depicted embodiment, a clock spring 146 may be disposed inside the main gear 130 and coupled to the upper and lower arc arms 112, 116. The clock spring 146 keeps the upper and lower arc arms 112, 116 under a constant force such that they tend to return to the closed position. The upper and lower arc arms 112, 116 and the clock spring 146 provide a clamping action to retain the electronic device.

The device holder 100 may further include a push-push mechanism 148. In some embodiments as illustrated in FIGS. 1A-1C, the device holder is mounted behind a seat cover and only an upper edge of the upper arc arm and lower edge of the lower arc arm are revealed, which may be used to unlock the push-push mechanism 148 to allow the movement of the upper and lower arc arms. In some embodiments, the push-push mechanism may include a locking pin 150 disposed on one side of the base 102. The locking pin 150 may lock the upper gear rack 136 on its moving path. Once a user pushes the upper edge 114 of the upper arc arm 112, the locking pin 150 is moved away from the path or the upper arc arm is unlocked. The upper and lower edges 114, 118 may be popped out from a surface of the seat back upon the activation of the push-push mechanism 148 so that the user may pull out the upper arc arm 112 or the lower arc arm 116 to create a desired distance to hold the electronic device. Alternatively, a locking pin may be disposed on another side of the base 102 to lock and unlock the lower gear rack 138 so that the lower edge 118 of the lower arc arm 116 may be used to unlock the lower arc arm. In yet another embodiment, both upper and lower arc arms are locked by pins and are unlocked by pressing both upper and lower edges, 114, 118.

In some embodiment, the base 102 may be moveable relative to a fixed body (not shown), which may be a seat frame or a separate fixed body. The device holder 100 may include mounts 152 fixed on the fixed body and positioned on two sides of the base 102. The mounts 152 may include liner guides 154 to guide movement of the base 102. The device holder 100 may further include compression springs 152 disposed on the upper and lower portions of the base 102 to bias the base to a direction away from the base 102 or away from the seat.

The device holder 100 may holder various sizes of the electronic devices because a distance between the upper and lower edges of the upper and lower arc arms can be adjusted by the user. Further, the arc-shaped arms can adapt different configuration of the seat back by extending the arm from the surface of the seat back. Furthermore, the movement of the base can further accommodate the shape of the seat. In some applications in which there is a seat cover, the device holder can be hidden in the seat back and essentially invisible at a non-use position.

Figure 5:
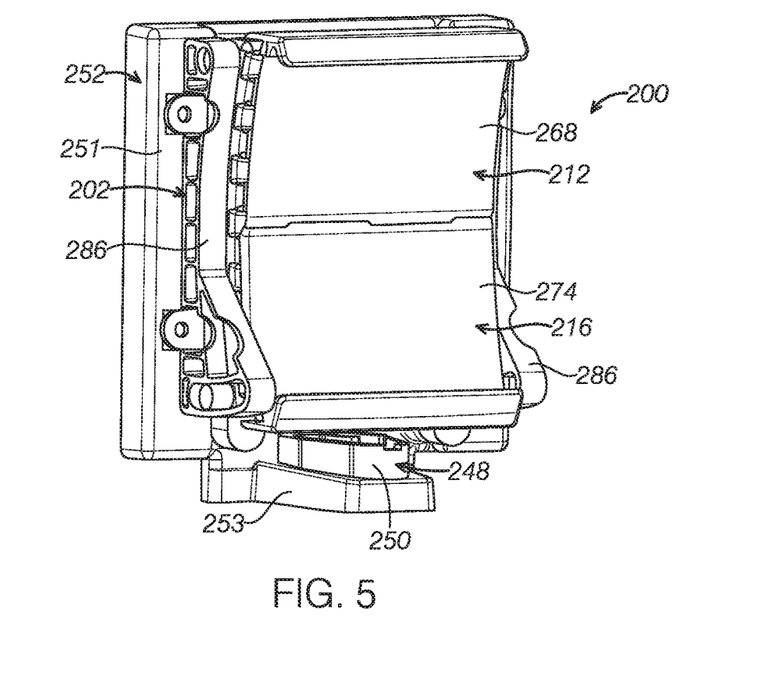
FIG. 5 is a rotated view of a device holder at a non-use position according to another embodiment of the present disclosure.

FIGS. 5-12 illustrates a device holder 200 according to another embodiment of the present disclosure. The device holder 200 may be a device holder to hold an electronic device such as a smart phone, a tablet or an electronic note book. FIG. 5 shows the device holder 200 at a non-use position or a closed position. The device holder 200 may include a base 202, an upper arc arm 212 and a lower arc arm 216. In some embodiments, the base 202 may be configured to be moveable as a swing body 202 as described in detail below. At the closed position, the upper arc arm 212 and the lower arc arm 216 together cover the swing body 202. Such configuration is especially advantageous when the device holder 10 is used without being concealed in a seat cover because a better appearance is provided at the non-use position. In some embodiments, the device holder 200 may include a fixed body 252 to support the swing body 202 and the parts attached to the swing body 202. In the depicted embodiment, the fixed body 252 includes a main body 251 and a foot portion 253 extended from and formed an angle with the main body 251.

As shown in FIG. 5, the device holder 200 may further include a push-push mechanism 248 having a selector 250 and disposed on the foot portion 253 of the swing body 202, which will be described in detail below. In some embodiments, the device holder 200 may be hidden under a seat cover.

Figure 6A:
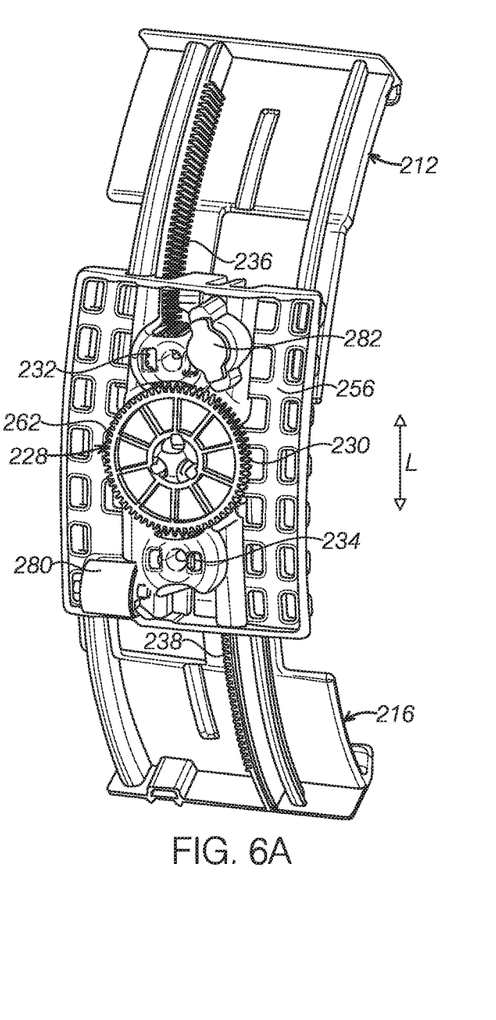
FIG. 6A is a rotated view of the back of the device holder depicted in FIG. 5 with the arms in a full deployed position and the fixed body removed.
Figure 6B:
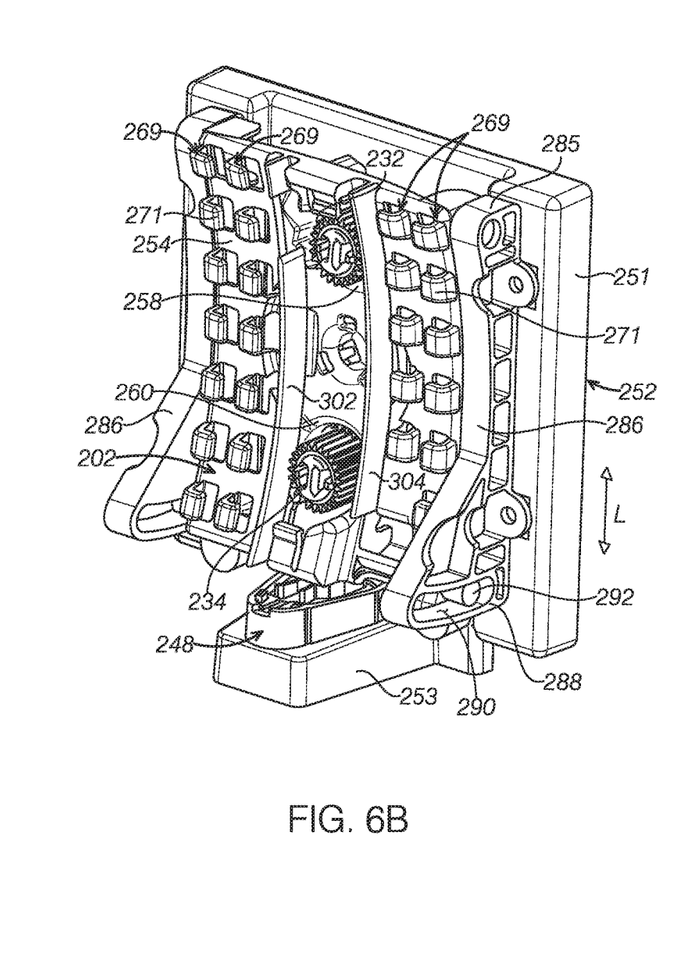
FIG. 6B is a rotated view of the front of the device holder in FIG. 5 with the arms removed.

FIGS. 6A-6B are rotated views of the device holder 200 depicted in FIG. 5. FIG. 6A is a rotated back view with the arms in a full deployed position and the fixed body removed. FIG. 6B is a rotated front view with the arms removed. The device holder 200 may include a drive device 228 to enable synchronized movement of the upper arc arm 212 and the lower arc arm 216. The drive device 228 may include a main gear 230, an upper secondary gear 232 engaged with the main gear 230 and a lower secondary gear 234 engaged with the main gear 230. The main gear 230, the upper secondary gear 232 and the lower secondary gear 234 are received in the swing body 202. The device holder 200 may further include an upper gear rack 236 attached to the upper arc arm 212 and engaged with the upper secondary gear 232, and a lower gear rack 238 attached to the lower arc arm 216 and engaged with the lower secondary gear 234. The main gear 230 enables simultaneous rotations of the upper secondary gear 232 and the lower secondary gear 234 while the rotations are converted to arc motion of the upper and lower arc arms 212 and 216 via the engagement between the upper secondary gear 232 and the upper gear rack 236 and the engagement between the lower secondary gear 234 and the lower gear rack 238. As such, the coordinated movements of the upper and lower arc arms can be performed. In other words, arc motion of the lower arc arm 216 can be converted to rotations of the lower secondary gear 234, the main gear 230 and the upper secondary gear 232, which in turn is converted to an arc motion of the upper arc arm 212, and vice versa. As such, coordinated movement of the two arc arms can be accomplished.

Figure 7:
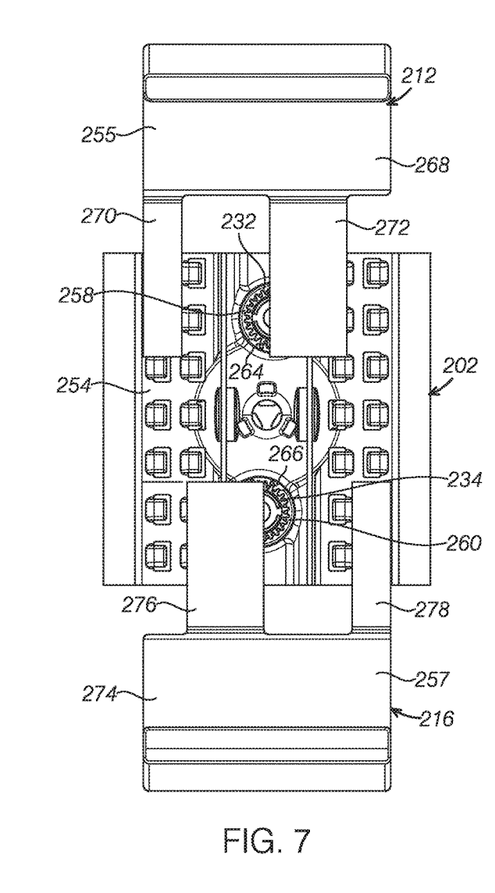
FIG. 7 is a partial front view of the device holder depicted in FIG. 5 with the fixed body removed.
Figure 8:
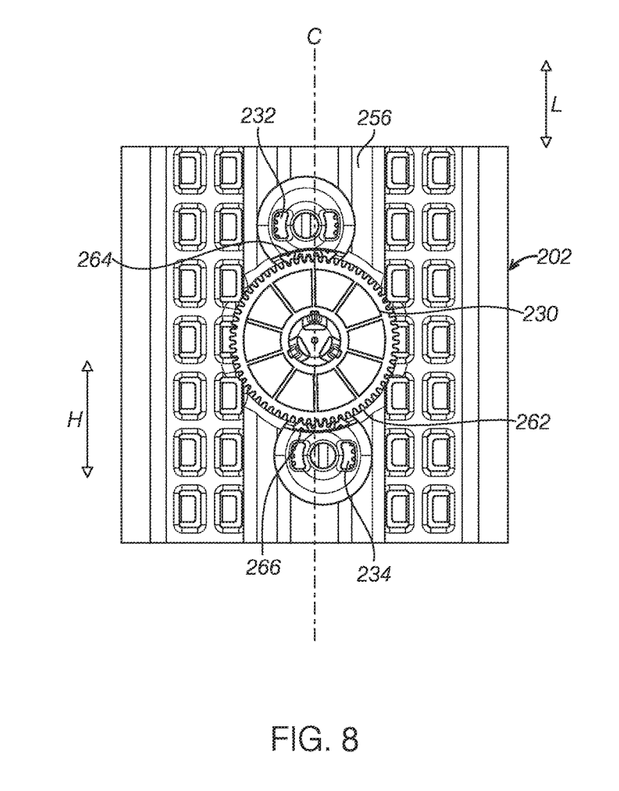
FIG. 8 is a partial back view of a base of the device holder depicted in FIG. 5.

Continuing with FIGS. 6A-6B and with reference to FIGS. 7-8, the swing body 202 includes a first side 254 and a second side 256 opposite to the first side 254. The main gear 230 may be disposed on the second side 256 of the swing body 202, and the upper secondary gear 232 and the lower secondary gear 234 may be disposed on the first side 254 of the swing body 202. In some embodiments, the centers of the upper secondary gear 232, the main gear 230 and the lower secondary gear 234 are positioned substantially in a line C extending at a length direction L of the device holder 200. In one example, the line C is a central line of the swing body 202 at the length direction L. The first side 254 of the swing body 202 may include an upper recess 258 and a lower recess 260 to receive the upper secondary gear 232 and the lower secondary gear 234, respectively. The second side 256 of the swing body 202 may further include a middle recess 262 to receive the main gear 230. The middle recess 262 are recessed from in a direction opposite to that of the upper and lower recesses 258, 260. Referring to FIGS. 7-8, the middle recess 262 may be connected with the upper recess 258 and the lower recess 260 via apertures 264, 266 so that the main gear 230 can engage with the upper secondary gear 232 and the lower secondary gear 234. In some embodiment, the main gear 230, the upper secondary gear 232 and the lower secondary gear 234 may be straight gears.

Figure 9:
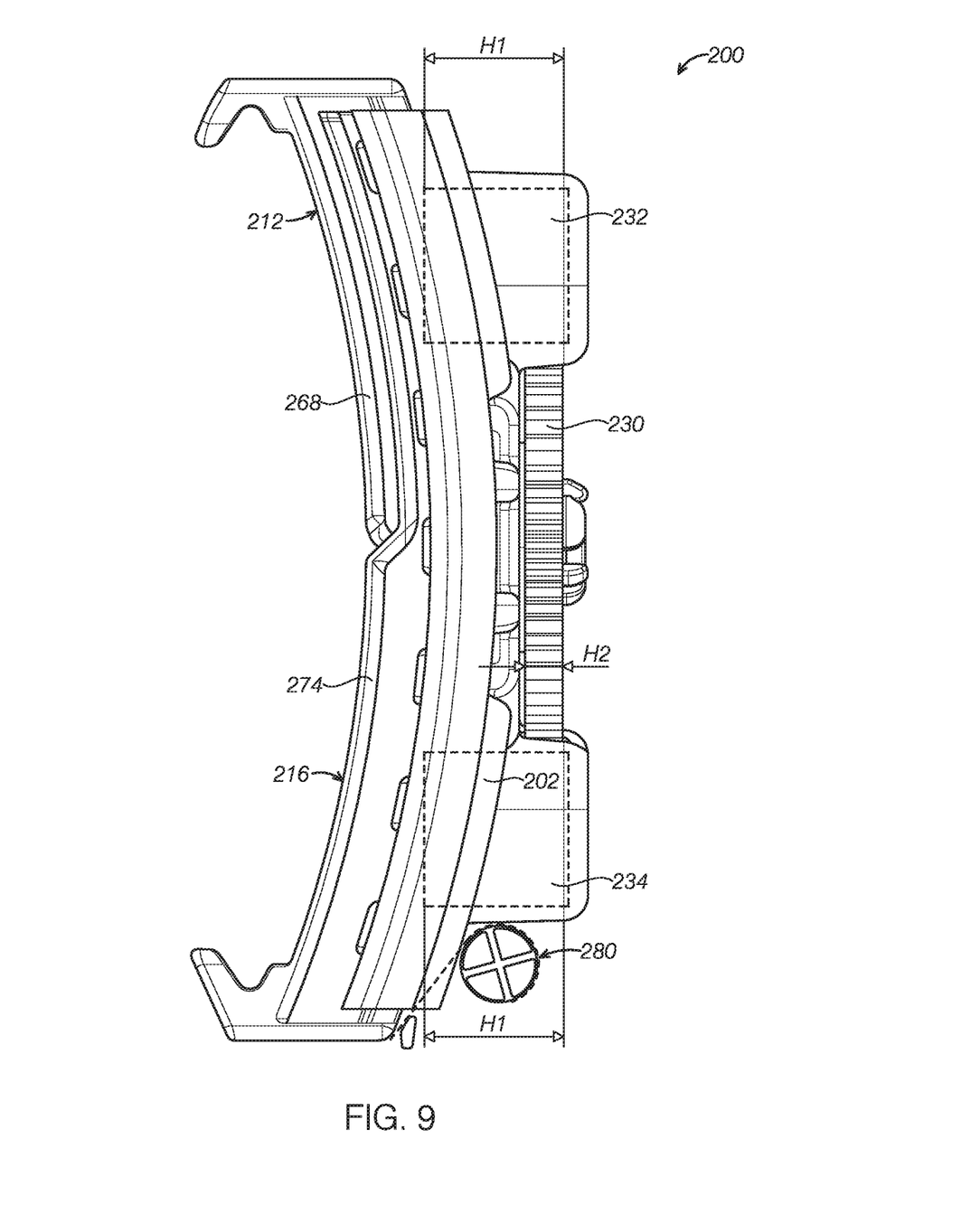
FIG. 9 is a side view of the device holder depicted in FIG. 5, but with a fixed body removed.

As shown in FIG. 9, in some embodiments, a thickness H1 of the upper and lower secondary gears 232, 234 is greater than a thickness H2 of the main gear 230. In this way, all gears work at a single one plane even though the gears are disposed on opposite sides. The planar gear connection provides robust mechanism. Further, such configuration can allow small gear teeth for fine adjustment and allow small gears to provide a tight gear package. Furthermore, disposition of the main gear 230 and the upper and lower gears 232, 234 at two sides allows the flexibility to arrange the gear on the swing body 202 and more freedom on design of the upper and lower arc arms 212, 216.

Turning back to FIG. 7, the upper arc arm 212 may include an upper cover 268 and a plurality of upper inserts 270 and 272 which are spaced apart each other and recessed from an outer surface 255 of the upper cover 268. The upper gear rack 236 is disposed on the upper cover 268 and one of the upper inserts 270, 272 on an inner surface of the upper arc arm 212. Similarly, the lower arc arm 216 may include a lower cover 274 and a plurality of lower inserts 276 and 278 which are spaced apart and recessed from an outer surface 257 of the lower cover 274. The lower rack 238 is disposed on the lower cover 274 and one of the lower inserts 276, 278 on an inner surface of the lower arc arm 216. The upper inserts 270, 272 are staggered away from the lower inserts 276, 278. In other words, the upper inserts 270, 272 do not overlap with the lower inserts 276, 278 or the upper inserts 270, 272 correspond to the spaces between the lower inserts 276, 278. The entire upper arc arm or the entire lower arc arm may be formed from plastic and molded as one piece.

Referring to FIGS. 5 and 9, the upper insets 270, 272 are slid under the lower cover 274 and the lower inserts 276, 278 are slid under the upper cover 268 so that the upper cover 268 and the lower cover 274 conceal the swing body 202 at the closed position. The inserts under the covers restrict the movement of the upper and lower arc arms 212, 216 at a direction perpendicular to a main surface of the swing body 202 and thus further secure the upper and lower arc arms 212, 216 at the closed position. While the upper and lower arc arms 212, 216 are shown to have two inserts in the depicted embodiment, it should be appreciated that any number of the inserts are possible.

Figure 10:
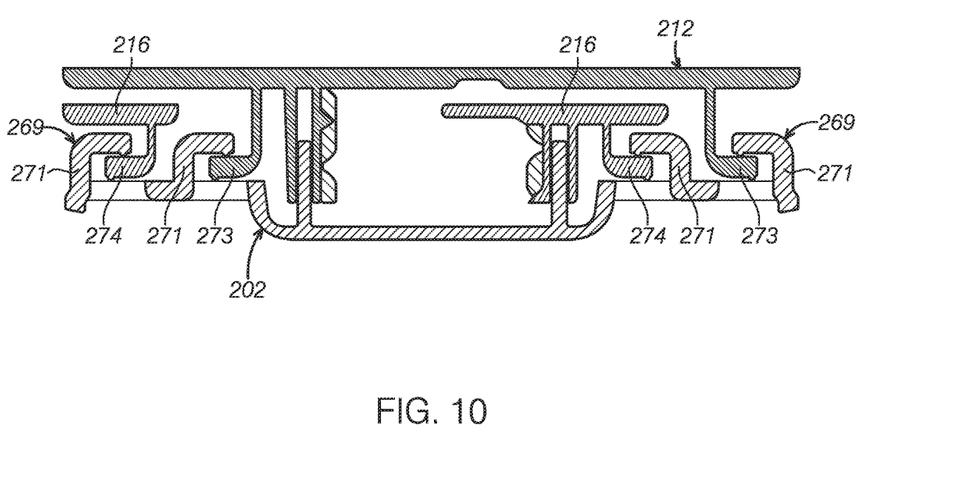
FIG. 10 is a cross sectional view of a base and arc arms of the device holder depicted in FIG. 5.

FIG. 10 is a cross sectional view of a base and arc arms of the device holder 200, showing projected sections of the upper and lower arc arms 212, 216 at a closed position. Referring to FIGS. 6A, 6B and FIG. 10, the swing body 202 may further include tracks 269 on the first side 254 of the swing body 202, each track may guide the movement of the upper and lower arms, 212, 216. In some embodiments, one track 269 may consist of a column of L-shaped protrusions 271 from the first side 254. In the depicted embodiment, four columns of L-shaped protrusion 271 are provided. The upper and lower arms 212, 216 may include a corresponding L-shaped rib 273, 274 respectively and extend from a surface facing the swing body 202 along length L of the swing body 202 and complement to the L-shaped protrusions 271. In this way, the L-shaped protrusion 271 can restrict lateral movement of the upper and lower arms 212, 216 at a direction substantially perpendicular to the length direction L.

Continuing with FIGS. 5, 6A and 6B, FIG. 7 and FIG. 10, the swing body 202 may have a curved shape to conform the arc of the upper and lower arc arm 212, 216. A first protrusion wall 302 and a second protrusion wall 304 may be formed on the first side 254 of the swing body 202 along a moving path of the upper and lower arc arms 212, 216. Further, the upper and lower arms 212, 216 may include paired ribs 275 to receive the first and second protrusion walls 302, 304, respectively to further guide the movement between the upper and lower arms 212, 216 and the swing body 202 in a desired path.

Figure 11A:
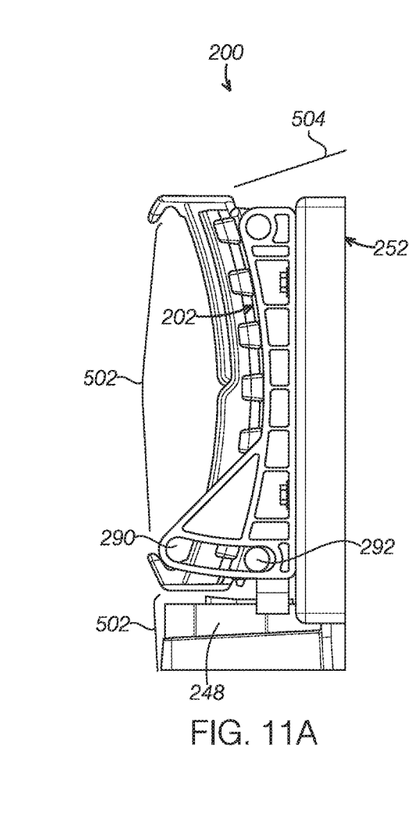
FIGS. 11A-11C are side views of the device holder depicted in FIG. 5 for the various mechanism stages.
Figure 11B:
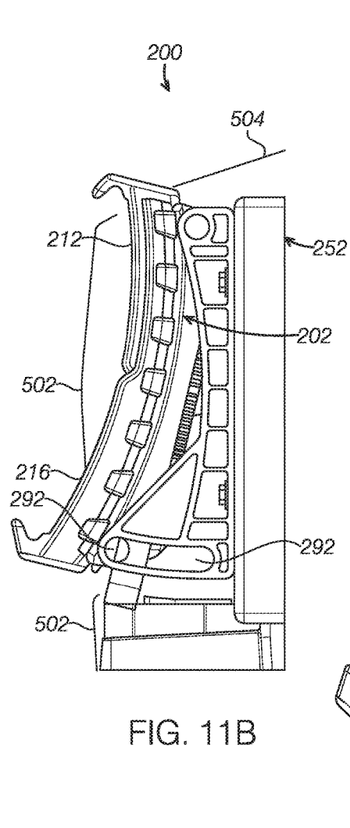
Figure 11C:
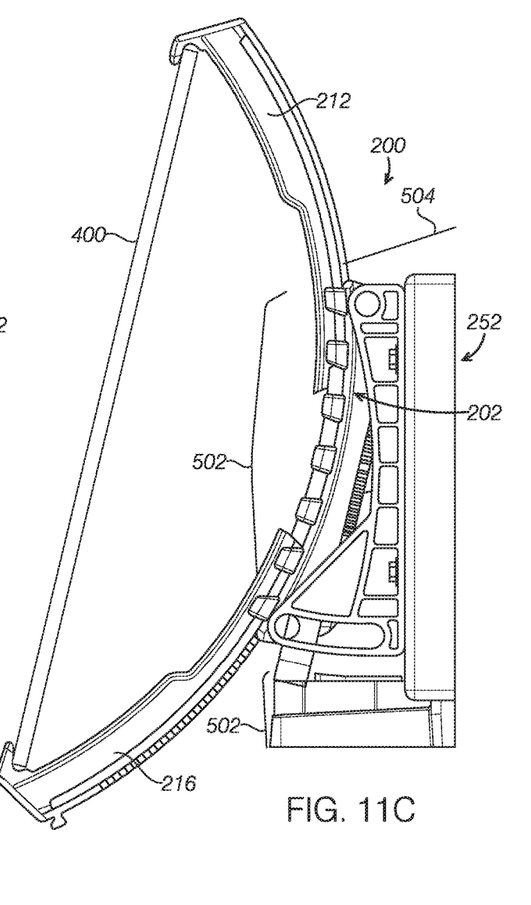

The swing body 202 is advantageous in its ability to accommodate the shape of a seat as illustrated in FIGS. 11A-11C which shows the device holder 200 in a stowed position with the locked swing body 202, an activated position with the unlocked swing body 202, and an open position to receive an electronic device 400, respectively. FIGS. 11A-11C further schematically show a side surface 502 of a seat back and a top surface 504 of the seat back. At the stowed position shown FIG. 11A, the device holder 200 fits flush with the side surface 502. That is, the device holder 200 can be substantially concealed in a cover of the seat back. At the activated position shown in FIG. 11B, a lower portion of the lower arm 216 is moved away from a plane of the side surface 502 and ready to be released to the open position. At the open position shown in FIG. 11C, the upper and lower arc arms 212, 216 are moved out and a user can put the electronic device 400 into the upper and lower arc arms 212, 216. The distance between the edges of the upper and lower arms 212, 216 can be adjusted by the user to fit various sizes of the electronic devices. It should be appreciated that the device holder 200 may be assembled on a seat without a cover. The base 202 may not need to be moveable and the components necessary for the operation of the swing body may be omitted.

Turning back to FIGS. 6A-6B, FIG. 9, the device holder 200 may further include a roller spring 280 coupled to an edge portion of the lower arc arm 212 to bias the upper and lower arc arms 212, 216 to the closed position. In some embodiments, the roller spring 280 may be a tape spring. In the depicted embodiment, the roller spring 280 is disposed at the bottom portion of the swing bod 202 and is coupled to the lower arc arm 216.

The device holder 200 may further include a damper package 282 disposed adjacent to the upper secondary gear 232 to control the speed of movement of the drive device 228. As an alternative, it should be appreciated that the damper package 282 may be disposed only or as an addition at the lower secondary gear 234. The damper package 282 may be a standard viscous gear. When an electronic device is removed from the holder 200, the upper arc arm 212 and lower arc arm 216 can be returned to the closed position through damped movement.

Continuing with FIGS. 5, 6A-6B, 11A-11C, and 12, the swing body 202 may be pivotably connected to a top portion of the fixed body 252 to enable swing motion. The movement of the swing body 202 is guided and confined by two guides 286 disposed adjacent to two opposite sidewalls of the swing body 202 and connected to the swing body 202. The guide 286 may include a top portion 285 connected with the top portion of the swing body 202 and a foot 288. The foot 288 is positioned at a bottom portion of the guide 286 and has an elongated aperture 290 to receive a shaft 292 extending from the swing body 202. An upper portion of the swing body 202 may be connected to the fixed body 252 and a lower portion of the swing body 202 may move away and toward the fixed body 25. As shown in FIGS. 11A-11C, as the shaft 292 is received in the elongated aperture 290, the movement of the swing body 252 may be restricted. The movement of the swing body 202 allows the device holder 200 to accommodate the shape of the set back and the space variation on the seat back.

Figure 12:
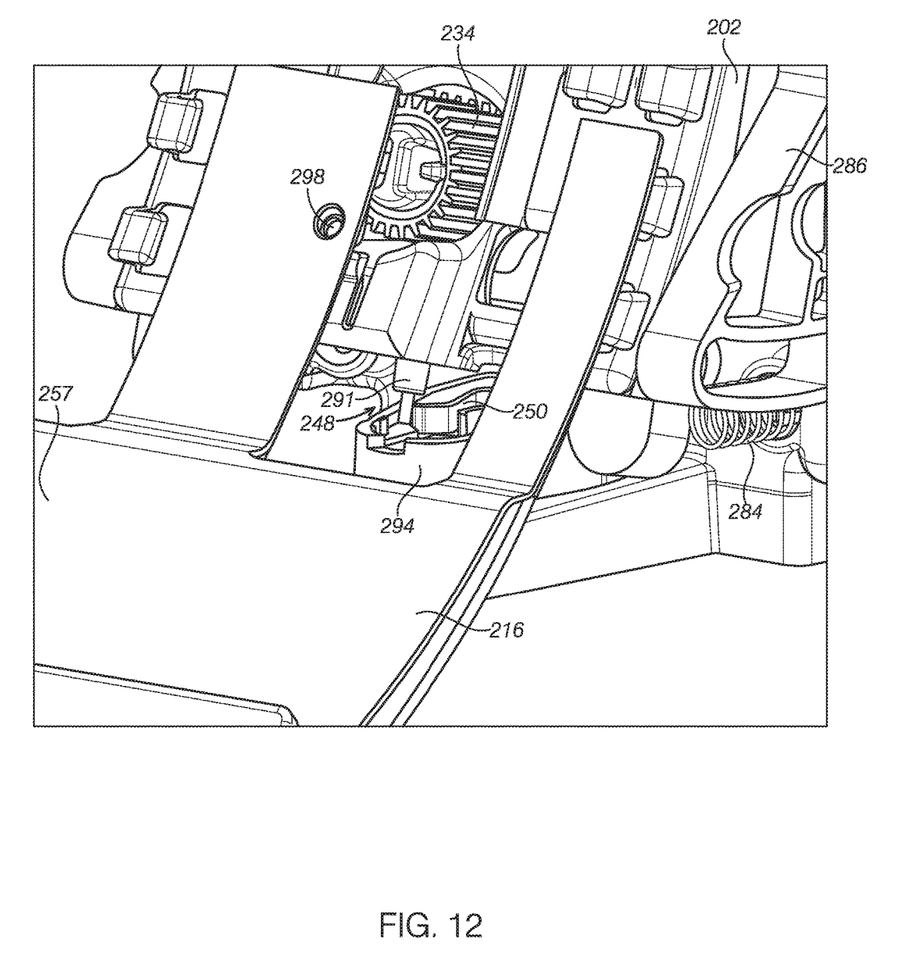
FIG. 12 is an enlarged rotated view of view of a bottom portion of the device holder depicted in FIG. 5.

Referring to FIG. 12 and with further reference to FIGS. 11A-11C, the push-push mechanism 248 is described in detail. The push-push mechanism 248 is configured to lock and release the swing body 202. The push-push mechanism 248 may include a selector 250 and a selector guide 294. The selector guide 294 may be disposed on the foot portion 253 of the fixed body 252 and formed an angle with a main surface of the fixed body 252. The selector 250 may be rotated inside the selector guide 294 and include a cam 296 to receive a pin 291 disposed at a bottom of the swing body as shown in FIG. 12. When the pin 291 is received in the cam 296, the swing body 202 is locked. When a force is applied to the selector 250, the selector 250 is rotated to release the pin 291 from the cam 296 to unlock the swing body 202. With further reference to FIGS. 11A and 11B, the movement of the lower arc arm 212 is blocked at the stowed position in FIG. 11A. When the swing body 202 is unlocked to the activated position shown in FIG. 11B, the lower arc arm 212 is free to move. In other words, the push-push mechanism 248 controls the movement of the lower and upper arc arms via the swing body 202. It should be appreciated that any suitable push-push mechanism may be used.

Now referring to FIG. 12, the device holder 200 may further include two coil springs 284 disposed at the bottom portion of the swing body 202 and connected to the spring body 202. The coil springs 284 bias the swing body 202 to its opening position when the swing body 202 is unlocked or the pin 291 is released from the cam 296. At the locked position as shown in FIG. 11B, the coil springs 284 prevents the swing body 202 swing out accidentally from its resting position until a user apply a force bigger than the spring load to activate the selector 250 so that the swing body 202 can travel in the selector guide 294.

Continuing with FIG. 12, a rubber bumper 298 may be disposed on a side of the lower arc arm 216 facing the swing body 202. The rubber bumper 298 functions to stop the lower arc arm 216 in its furthest deployed position. Similarly, the rubber bumper 298 may be disposed on a side of the upper arc arm 212 to stop the upper arc arm 212 in its furthest deployed position.

In some embodiments, the device holder 200 may further include a lock mechanism (not shown) to prevent the unlocking of the arc arms if the device holder 200 is subject to a gravity force greater than a predetermined value. The lock mechanism may be any suitable device currently available or later developed.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A device holder, comprising:
   a base;
   an upper arc arm;
   a lower arc arm; and
   a drive device,
   wherein the upper arm and the lower arc arms are attached to the drive device and moveably between a non-use position and a use position and the drive device enables a synchronized movement of the upper arc arm and a lower arc arm at opposite directions and the upper and lower arc arms are curved about an axis substantially parallel to the base.

2. The device holder of claim 1, wherein the drive device includes a main gear, an upper secondary gear, and a lower secondary gear, wherein the upper arc arm includes an upper gear rack and the lower arc arm includes a lower gear rack, wherein the upper secondary gear is engaged with the upper gear rack and the main gear, respectively, and the lower secondary gear is engaged with the lower gear rack and the main gear, respectively.

3. The device holder of claim 2, further comprising a swing body, wherein the swing body has a first side and a second side, wherein the main gear is disposed on the second side of the swing body, the upper secondary gear and the lower secondary gear are disposed on the first side of the swing body, wherein a thickness of the upper and lower secondary gears is greater than a thickness of the main gear.

4. The device holder of claim 3, wherein centers of the upper secondary gear, the main gear and the lower secondary gear are positioned substantially in a line that is substantially parallel to a side of the swing body.

5. The device holder of claim 4, wherein the swing body includes a middle recess opened to the second side and configured to receive the main gear, an upper recess opened to the first side and configured to receive the upper secondary gear, and a lower recess opened to the first secondary and configured to receive the lower secondary gear, wherein a wall defined the middle recess includes two apertures connecting the upper and lower recesses so that the main gear are engaged with the upper and lower secondary gears.

6. The device holder of claim 5, further comprising a damper linked with one of the upper and lower secondary gears or both the upper and lower secondary gears.

7. The device holder of claim 6, further comprising a tape spring attached to the lower arc arm or the upper arc arm, or a plurality of springs attached to both the upper and the lower arms to bias the upper and lower arc arms in the closed position.

8. The device holder of claim 7, further comprising a fixed body, two guides disposed on the fixed body, wherein the swing body is attached to the fixed body and disposed between the two guides.

9. The device holder of claim 8, further comprising a push-push mechanism being locked and unlocked with the swing body.

10. The device holder of claim 9, wherein the push-push mechanism includes a selector having a rotation arm to receive a pin connected to the swing body to lock and unlock the swing body, and a selector guide, wherein the selector is disposed in the selector guide.

11. The device holder of claim 1, further comprising a base, wherein the upper secondary gear, the main gear and the lower secondary gear are attached to the base and disposed on one side the base.

12. The device holder of claim 11, wherein centers of the upper secondary gear and the lower secondary gear are closer to a respective side of the base than a center of the main gear and wherein the base is moveable.

13. The device holder of claim 12, further comprising a clock spring disposed inside the main gear, wherein the clock spring is configured to maintain the upper and lower arc arms in the closed position.

14. The device holder of claim 13, further comprising a push-push mechanism, wherein the push-push mechanism includes a lock pin disposed on one side of body and coupled with the upper arc arm and wherein the lock pin is released to unlock the upper and lower arc arms when an upper edge of the upper arc arm is pressed by a user.

15. A device holder, comprising:
a base;
an upper arc arm;
a lower arc arm; and
a drive device attached to the base,
wherein the upper arc arm and the lower arc arm are attached to the drive device and moveably along a circumference of a circle having a center away from the base,
wherein the circle is at a plane substantially perpendicular to the base.

16. The device holder of claim 15, wherein the drive device includes a main gear, an upper secondary gear, and a lower secondary gear, wherein the upper arc arm includes an upper gear rack and the lower arc arm includes a lower gear rack, wherein the upper secondary gear is engaged with the upper gear rack and the main gear, respectively, and the lower secondary gear is engaged with the lower gear rack and the main gear, respectively.

17. A seat comprising:
a seat back
a device holder attached to the seat back, including
a base;
an upper arc arm;
a lower arc arm;
a drive device attached to the base,
wherein the upper arc arm and the lower arc arm are connected to the drive device and moveably along a common arc in opposite directions between a closed position and an open position,
wherein the common arc is at a plane substantially perpendicular to the base.

18. The seat of claim 17, wherein the upper arc arm includes an upper edge portion and the lower arc arm includes a lower edge portion, and the upper and lower edge portions are configured to be extended away from the seat back at the open position to hold an electronic device.

19. The seat of claim 17, further comprising a seat cover, wherein the electric device holder is disposed substantially inside the seat cover, wherein the upper and lower edge portions are visible at the closed position, and wherein the device holder includes a push-push mechanism and the upper arc arm and the lower arc arm are unlocked via actuation of the push-push mechanism or a swing body to which the upper and lower arc arms are attached is unlocked via actuation of the push-push mechanism.

20. The seat of claim 17, wherein the electric device holder is fixed on a frame of the seat.

* * * * *